United States Patent
Yatsu et al.

(10) Patent No.: US 7,525,415 B2
(45) Date of Patent: Apr. 28, 2009

(54) TACTILE PRESENTING DEVICE

(75) Inventors: Nobuo Yatsu, Shinagawa (JP); Satoshi Sakurai, Shinagawa (JP); Takashi Arita, Shinagawa (JP); Shinichiro Akieda, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 391 days.

(21) Appl. No.: 11/218,569

(22) Filed: Sep. 6, 2005

(65) Prior Publication Data

US 2006/0055515 A1    Mar. 16, 2006

(30) Foreign Application Priority Data

Sep. 6, 2004    (JP)    ............... 2004-259092

(51) Int. Cl.
*H04B 3/36* (2006.01)
(52) U.S. Cl. .................. 340/407.2; 345/173
(58) Field of Classification Search ............. 340/407.2, 340/407.1, 384.6; 345/156, 173
See application file for complete search history.

(56) References Cited

U.S. PATENT DOCUMENTS

| | | | | |
|---|---|---|---|---|
| 5,162,618 | A * | 11/1992 | Knowles | 367/907 |
| 6,822,635 | B2 * | 11/2004 | Shahoian et al. | 345/173 |
| 7,148,789 | B2 * | 12/2006 | Sadler et al. | 340/407.1 |
| 7,436,396 | B2 * | 10/2008 | Akieda et al. | 345/173 |
| 2003/0030544 | A1 * | 2/2003 | Smith | 340/407.2 |
| 2005/0253816 | A1 * | 11/2005 | Himberg et al. | 345/173 |
| 2007/0080951 | A1 * | 4/2007 | Maruyama et al. | 345/173 |
| 2007/0146334 | A1 * | 6/2007 | Inokawa | 345/173 |

FOREIGN PATENT DOCUMENTS

JP    2003-122507    4/2003

* cited by examiner

*Primary Examiner*—John A Tweel, Jr.
(74) *Attorney, Agent, or Firm*—Staas & Halsey LLP

(57) ABSTRACT

A tactile presenting device includes a panel presenting a tactile sensation, and a control unit that vibrates the panel in a direction perpendicular to a surface of the panel by magnetic force, the control unit vibrating the panel at a frequency equal to or lower than 50 Hz.

17 Claims, 11 Drawing Sheets

TACTILE PRESENTING DEVICE

CROSS-REFERENCE TO RELATED APPLICATIONS

This application is related to and claims the benefit of priority from Japanese Patent Application Publication No. 2004-259092, filed on Sep. 6, 2004 the entire disclosure of which is hereby incorporated by reference.

BACKGROUND

1. Field of the Invention

This invention generally relates to tactile presenting devices, and more particularly, to a tactile presenting device having the function of presenting a tactile sensation by vibrating a panel for presentation of tactile in a direction perpendicular to the plane surface.

2. Description of the Related Art

Recently, a touch panel has widely been used for personal computers, PDA, ATM equipment, POS terminals, car navigation, copying machines and so on. The touch panel has a flat panel, which may be depressed by a pen or finger, and outputs information indicative of the coordinates of a touched position. The conventional touch panels cannot present a tactile sense (click sense) associated with depressing, which may be presented by mechanical switches, and has a difficulty in presenting recognizable depressing.

Figure 1:
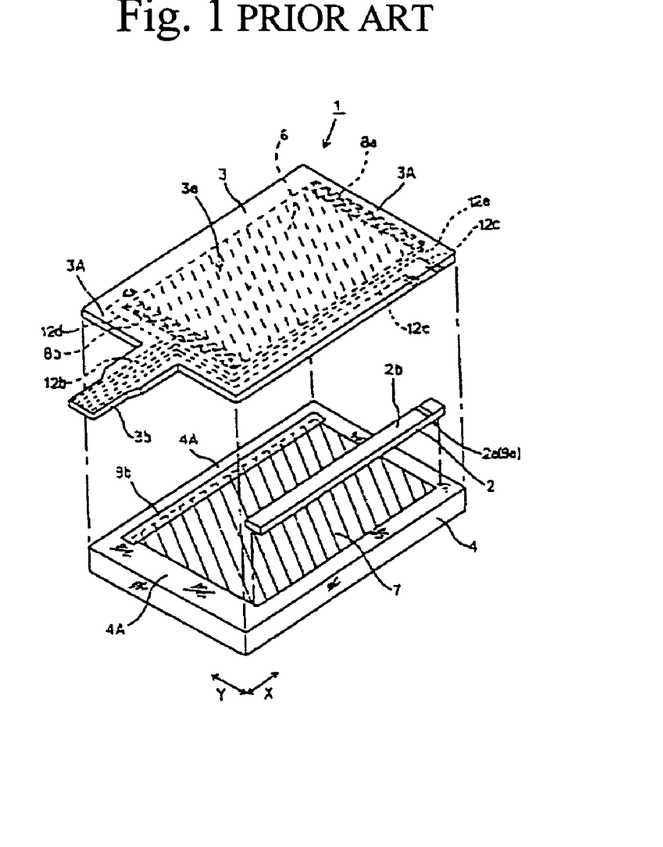
FIG. 1 shows a conventional touch panel input device.

Japanese Patent Application No. 2003-122507 discloses a method for presenting a tactile (click sense) sensation by vibrating a panel of a touch panel input device. FIG. 1 shows the touch panel input device disclosed in this application. A piezoelectric element 2 is used as a vibration source, which vibrates movable plates 3 of a touch panel 1.

Figure 2:
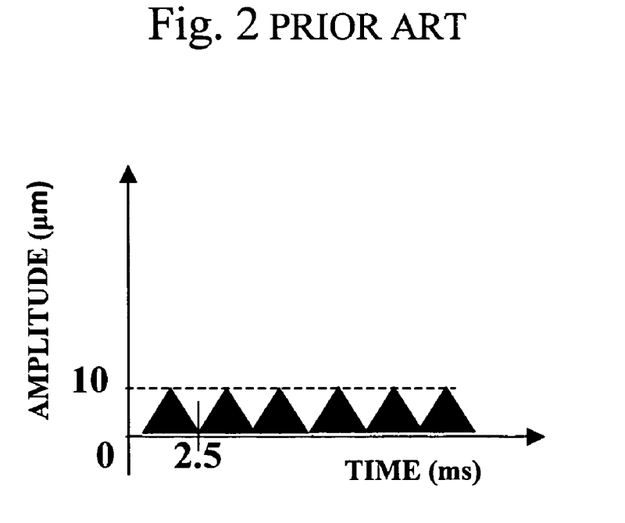
FIG. 2 shows a driving waveform used in the conventional touch panel.

However, the structure shown in FIG. 1 has a difficulty in low-voltage driving because of the use of the piezoelectric element 2, and needs to boost the ordinary operating voltage for electronic circuits in the range of 3 V to 5 V to hundreds of volts. The piezoelectric element is primarily suitable for high-frequency vibrations, and has small amplitudes of vibration. FIG. 2 shows an exemplary waveform for driving the piezoelectric element. The piezoelectric element vibrates at a frequency of approximately 400 Hz, and this vibration can be heard by ears of human being. The vibration is apparently different from a sense such that the button has been depressed.

SUMMARY

The present invention has been made in view of the above circumstances and has an object of providing a tactile presenting device and method capable of a practical depressing sense.

This object of the present invention is achieved by a tactile presenting device including a panel presenting a tactile sensation, and a control unit that vibrates the panel in a direction perpendicular to a surface of the panel by magnetic force, the control unit vibrating the panel at a frequency equal to or lower than 50 Hz.

The above object of the present invention is also achieved by a method of presenting a tactile sensation including the steps of vibrating a panel in a direction perpendicular to a surface of the panel by magnetic force; and controlling vibration of the panel at a frequency equal to or lower than 50 Hz.

Additional aspects and/or advantages will be set forth in part in the description which follows and, in part, will be apparent from the description, or may be learned by practice of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 3A:
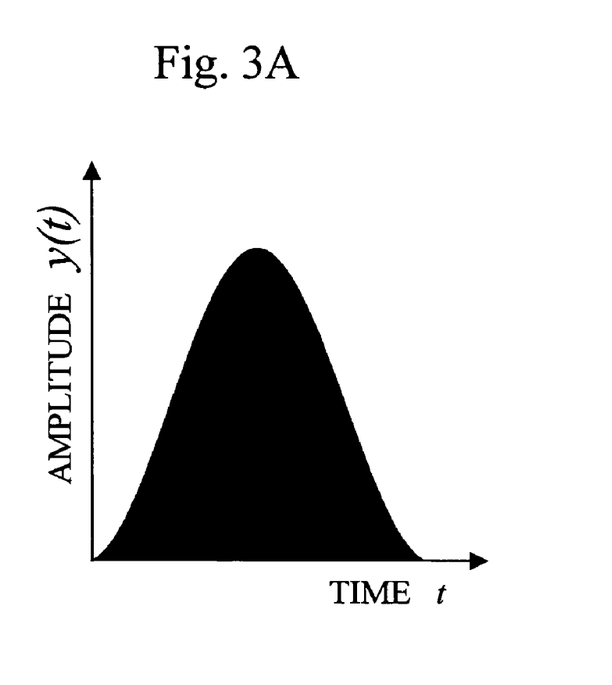
FIGS. 3A and 3B show vibration waveforms (or current driving waveforms) of a panel that may be used in the present invention.

A tactile presenting device according to one aspect of the present invention includes a panel for presenting a tactile sensation, and a control unit for vibrating the panel in a direction perpendicular to the plane surface by magnetic force to thus present a tactile sensation. The control unit vibrates the panel at a frequency equal to or lower than 50 Hz. The audible frequency sensed by the ears of the human being ranges from 20 Hz to 20,000 Hz. It may be preferable that the vibration has a frequency of 20 Hz or lower. However, this holds true for a vibration formed by a continuous wave. If a vibration is formed by a one-shot wave of a frequency equal to 20 Hz or lower, it may be difficult to sense the vibration of the panel. It is thus preferable that the one-shot wave has a frequency higher than 20 Hz. However, if a one-shot wave has a frequency higher than 50 Hz, it may be audibly sensed. As a result of the above consideration, it is preferable that the panel is driven by a one-shot wave having a frequency equal to or lower than 50 Hz, as shown in FIG. 3A. In this driving, the panel is vibrated once in only one of the two directions perpendicular to the plane surface of the panel. Preferably, the panel may be driven upwards. In FIG. 3A, the horizontal axis denotes time, and the vertical axis denotes the amplitude of vibration (or the magnitude of driving current).

Figure 3B:
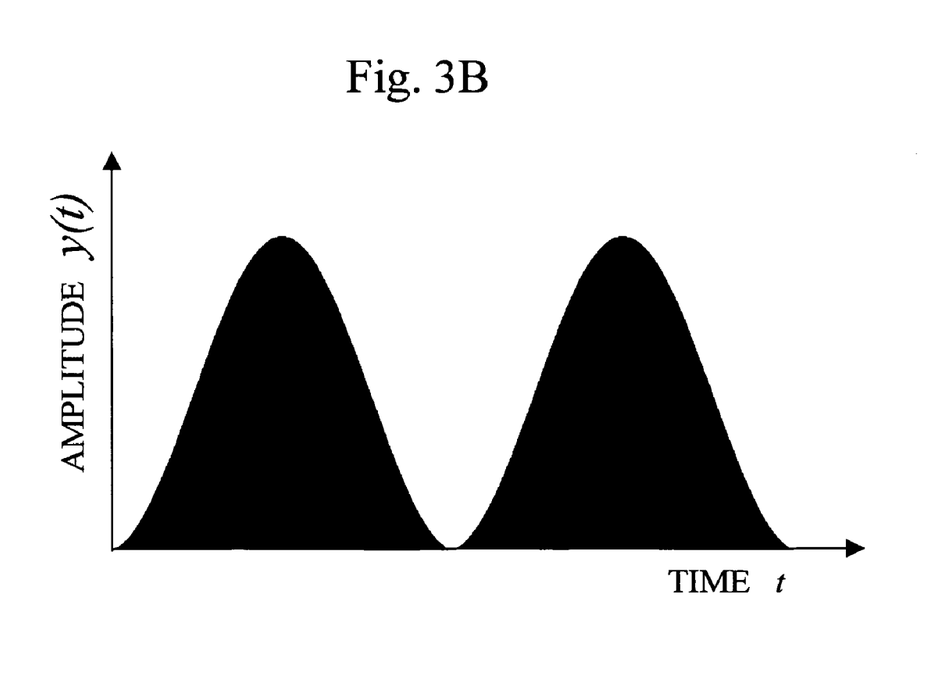
Figure 4:
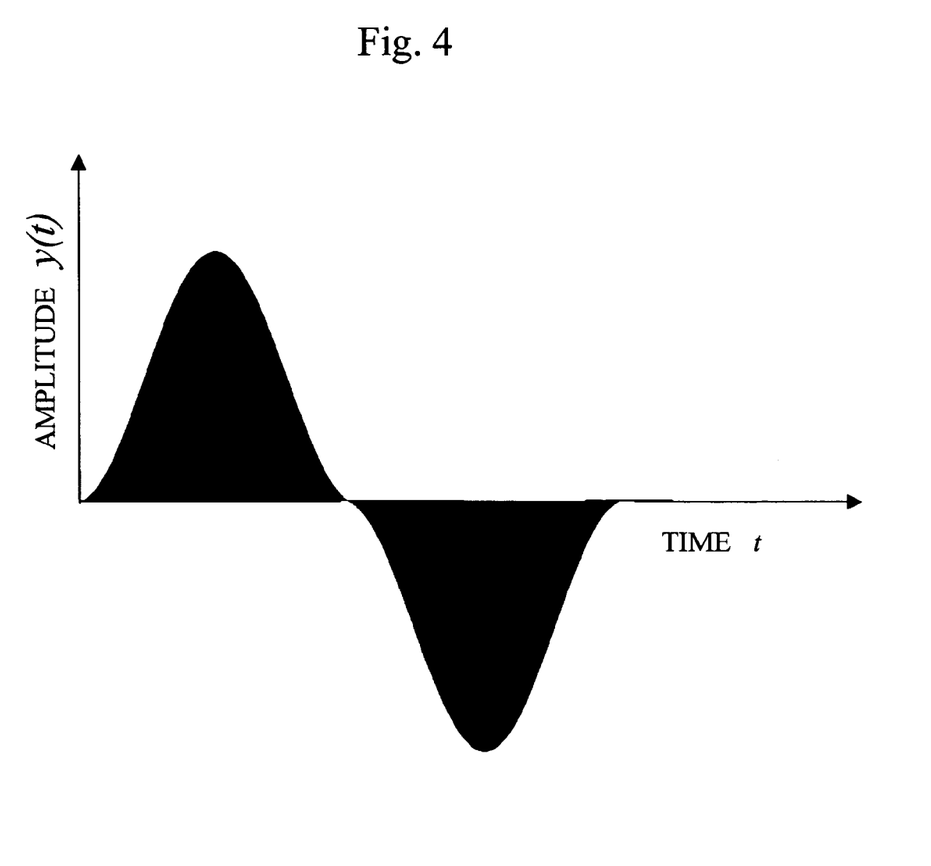
FIG. 4 shows another vibration waveform that may be used in the present invention.

Instead of the one-shot wave, as shown in FIG. 3B, the panel may be driven so as to successively generate multiple one-shot waves, each having a frequency equal to or lower than 50 Hz. That is, the panel is driven so as to generate multiple times in only one of the two directions perpendicular to the plane surface of the panel. It is also possible to drive the panel once by a pair of waves that have an identical shape but the opposite amplitudes, as shown in FIG. 4. It is also possible to drive the panel multiple times by multiple pairs of waves that have an identical shape but the opposite amplitudes. In this case, the panel is vibrated multiple times on both sides of the plane surface.

Even for the one-shot wave of a frequency equal to or lower than 50 Hz, if the one-shot wave rises quickly, it will contain high-frequency components, and the operator senses an impact shock vibration. Preferably, the one-shot wave gently rises like a wave obtained by squaring a sine wave. Preferably, the vibration of the panel has a wave that does not have any inflection point. The inflection point is defined as follows. That is, x=a is the inflection point of f(x) so that fx is convex upwards for x<a and is convex downwards for x>a, or fx is convex downwards for x<a and is convex upwards for x>a. For the wave rising gently, the operator does not sense an impact shock but purely senses a vibration. Preferably, the amplitude of vibration is equal to 0.2 mm or greater. The panel is driven when a given time elapses after touching of an object to the panel is sensed. This makes it possible for the operator to feel a sense similar to the actual depressing sense.

Figure 5A:
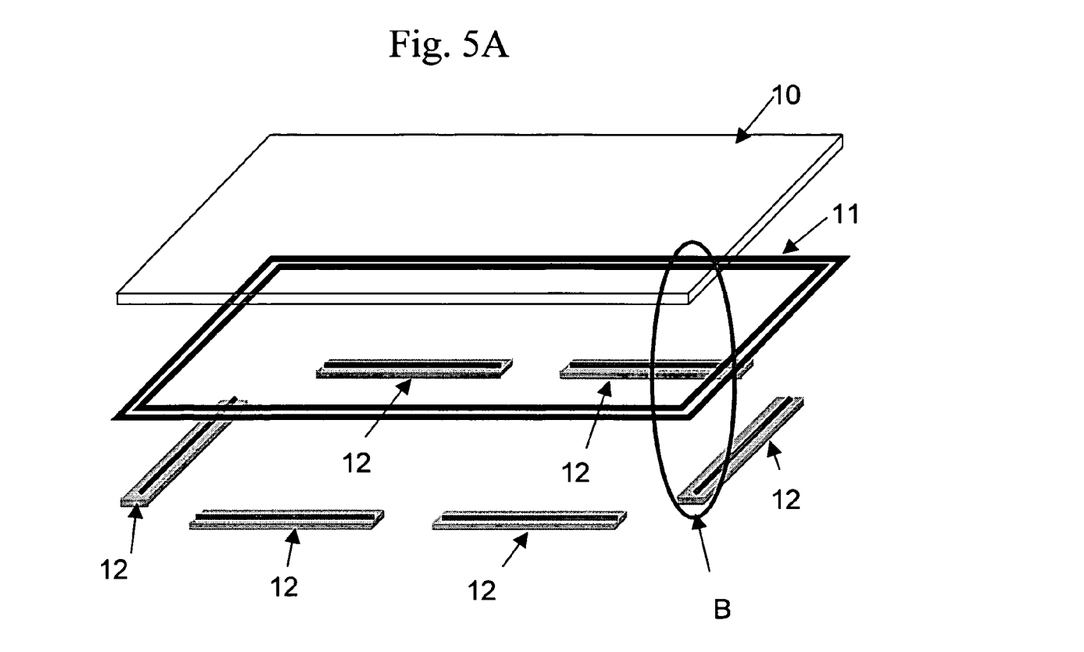
FIG. 5A is an exploded perspective view of a fundamental structure of a tactile presenting device according to an embodiment of the present invention.
Figure 5B:
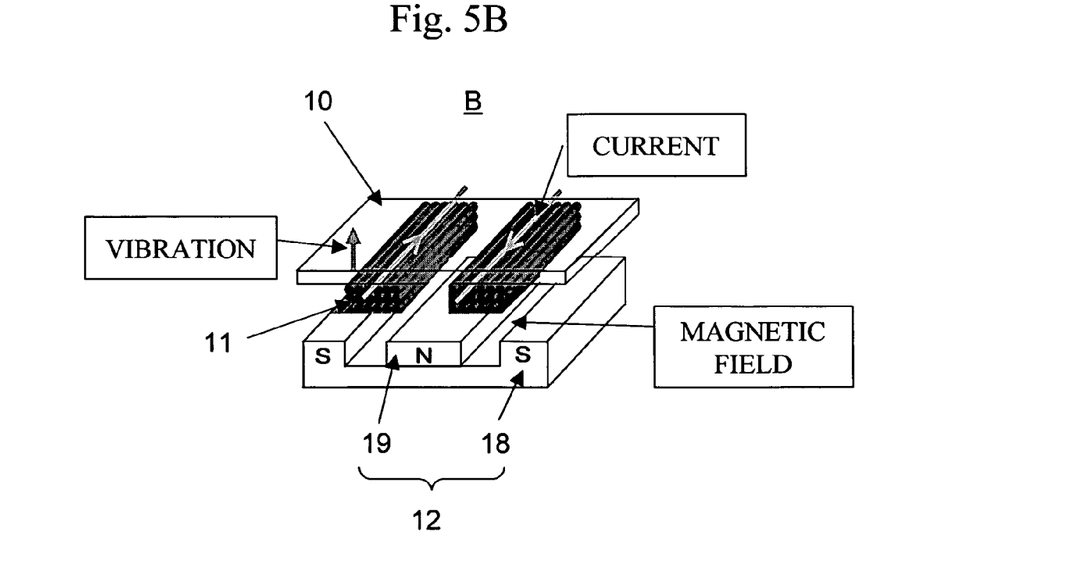
FIG. 5B shows a panel drive mechanism used in the tactile presenting device shown in FIG. 5A.

FIG. 5A is an exploded perspective view of the fundamental structure of a tactile presenting device according to an embodiment of the present invention, and FIG. 5B shows a panel driving mechanism used in the tactile presenting device, and is an enlarged view of a portion B shown in FIG. 5A. The tactile presenting device includes a panel 10, a coil 11 and multiple magnetic units 12, each of which includes a magnet and a yoke. The magnetic units 12 function as a control unit that vibrates the panel 10 in the vertical direction(s) with respect to the plane surface thereof, and thus presents a tactile sensation. The details of the panel 10 will be described later with reference to FIG. 8. The coil 11 is supported by the lower surface of the panel 10, and is wound along the four sides of the panel 10. As shown in FIG. 5B, the coil 11 is wound so that currents flow in the opposite directions along each side of the panel 10. The coil 11 may be formed by a single wire folded so as to flow the currents in the opposite directions, or may be two coils in which the opposing currents flow. The magnetic unit 12 includes a yoke 18 and a magnet 19. The yoke 18 has a substantially C-shaped cross section, and the magnet 19 is arranged in the central portion of the yoke 18. Due to the function of the yoke 18 and the magnet 19, two magnetic circuits are formed. One of the magnetic circuits flows the magnetic flux counterclockwise, and the other magnetic circuit flows the magnetic flux clockwise. The currents that flow in the opposite directions cross the magnetic fluxes of the two magnetic circuits, respectively. Force is exerted on the coil 11 by the two magnetic circuits and the opposing flows of currents according to the Fleming's left-hand rule. In the orientations of the magnetic poles and currents shown in FIG. 5B, upward force is exerted on the coil 11. This force vibrates the panel 10.

When currents flow through the coil 11 so as to form the vibration waveform shown in FIG. 3A, the panel 10 is vibrated upwards at only one time. When currents flow through the coil 11 so as to form the vibration waveform shown in FIG. 4, the panel 10 is vibrated upwards and downwards only once.

Figure 6:
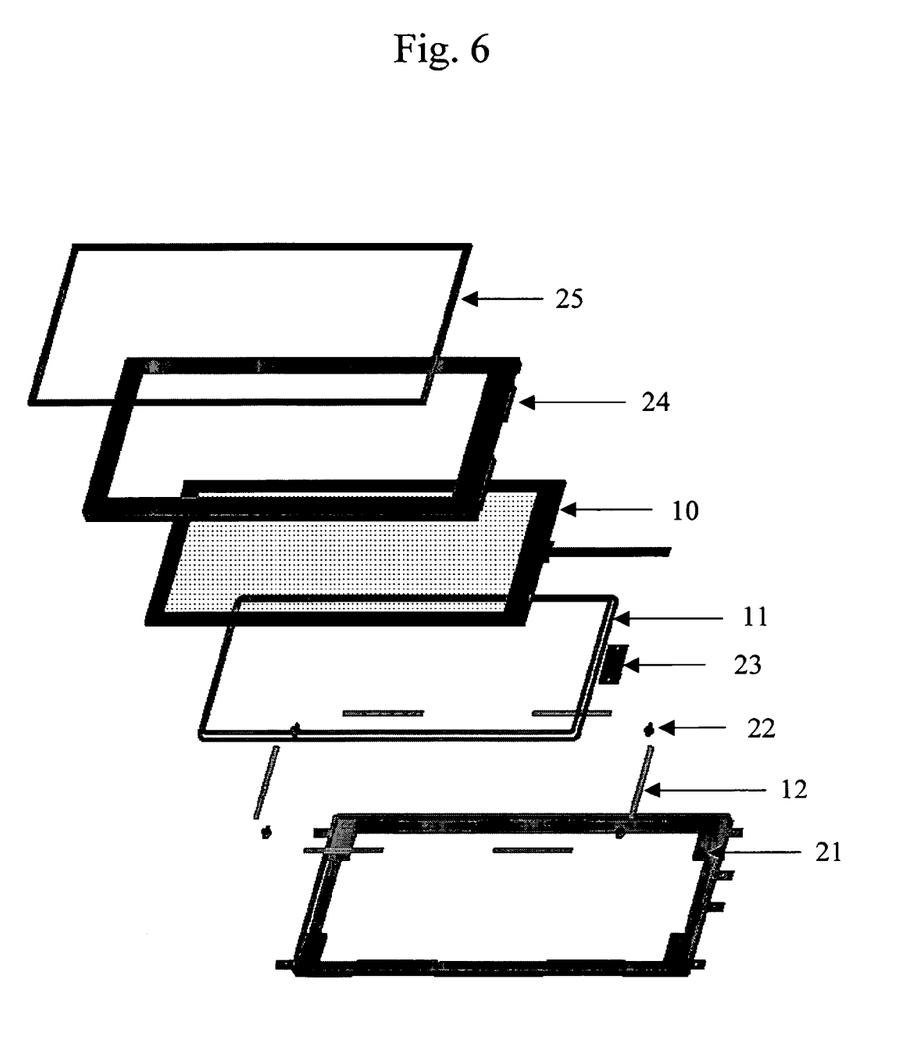
FIG. 6 is an exploded perspective view of the more detailed structure of the tactile presenting device shown in FIG. 5A.
Figure 7:
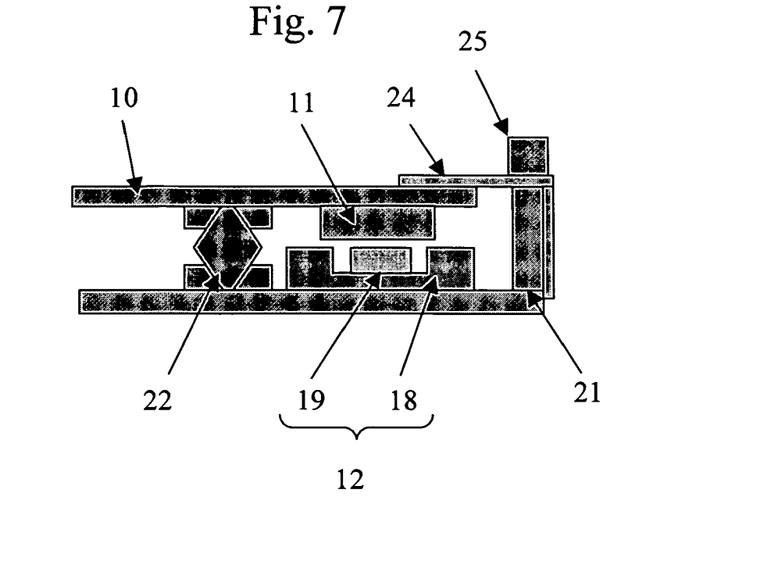
FIG. 7 is a cross-sectional view of a portion B shown in FIG. 5A.

FIG. 6 is a more detailed exploded perspective view of the tactile presenting device shown in FIG. 5, and FIG. 7 is a cross-sectional view of the portion B shown in FIG. 5A. The tactile presenting device includes a frame 21, the magnetic units 12, suspensions 22, a panel printed-circuit board 23, the coil 11, the panel 10, a cover 22 and a packing member 25, these structural parts being stacked in this order from the bottom side. The magnetic units 12 and the suspension 22 are mounted on the frame 21. The suspensions 22 are disposed in the vicinity of the four corners of the panel 10, and are in contact with the lower surface of the panel 10. The suspensions 22 suppress unwanted vibrations (frequency components over 50 Hz). The suspensions 22 may be made of an elastic member such as rubber. The elastic members of the suspensions 22 may have hollows in order to facilitate the efficiency of damping. The coil 11 is attached to the lower surface of the panel 10, and face the magnetic units 12 made of the yoke and the magnet 19. The panel 10 is supported by the cover 24 attached to the frame 21. The cover 24 has a sheet-like shape, and the packing member 25 is provided on the cover 24. The packing member 25 may be made of an elastic member, and is fixed to the peripheral portions of the panel 10. The panel printed-circuit board 23 has a panel drive circuit mounted thereon.

Figure 8:
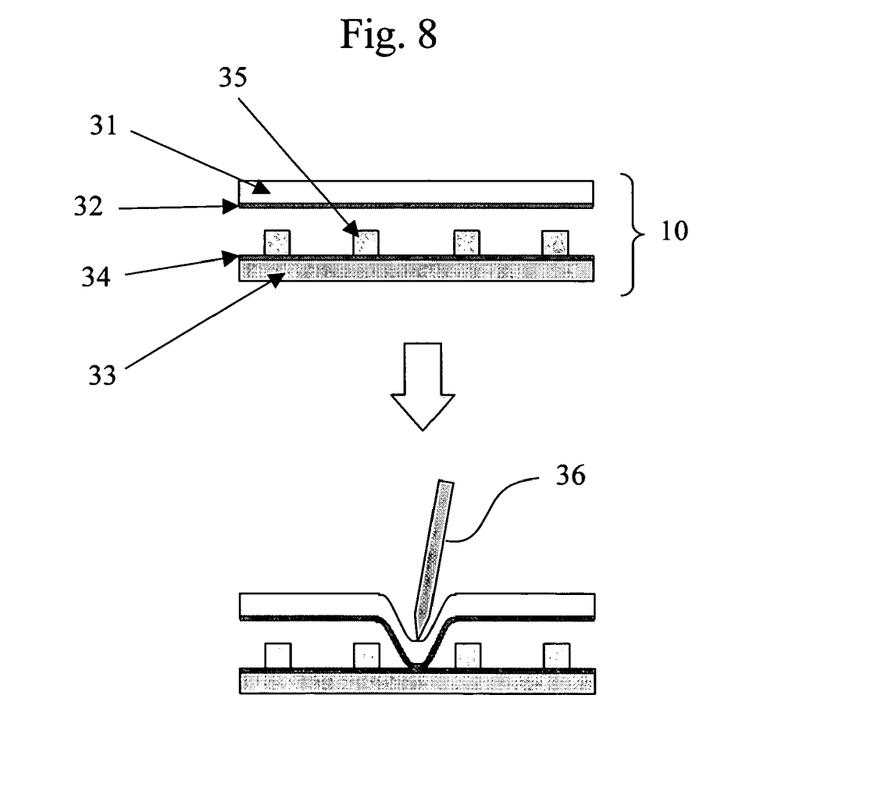
FIG. 8 is a cross-sectional view of a structure of the panel.

FIG. 8 shows a cross section of the panel 10. The panel 10 has a film 31 that may be made of PET (polyethylene terephthalate), an upper transparent electrode 32 that may be ITO (indium-tin oxide), a glass plate 33, a lower transparent electrode 34, and dot spacers 35. The upper transparent electrode 32 is attached to the entire inner surface of the film 31. The upper electrode 32 and the lower electrode 34 are connected to an analog-to-digital converter, which will be described later. The dot spacers 35, which may be made of an insulator, are arranged in a matrix formation. As shown in the lower part of FIG. 8, when the panel 10 is depressed from the upper side thereof by a pen or finger 36, the film 31 is deformed and the upper transparent electrode 32 is brought into contact with the lower transparent electrode 34. Several methods for detecting the coordinates of the depressed position are available, and any of these methods may be used. For example, a voltage is applied across the lower transparent electrode 34 in the X direction (transverse direction on the drawing sheet), and the potential at the depressed position (which corresponds to the X coordinate position) is detected via the upper transparent electrode 32. Similarly, a voltage is applied across the lower transparent electrode 34 in the Y direction (lateral direction on the drawing sheet), and the potential at the depressed position (which corresponds to the Y coordinate position) is detected via the upper transparent electrode 32. Analog voltages thus obtained are converted into digital signals, which show the coordinates as position information. Another detecting method applies a voltage across the upper transparent electrode 32 in the X direction, and detects the potential at the depressed position via the lower transparent electrode 34. Similarly, a voltage is applied across the upper transparent electrode 32 in the Y direction, and the potential at the depressed position is detected via the lower transparent electrode 32. In this manner, data showing the XY coordinates of the depressed position can be obtained. When the coordinates data is not needed, only one of the two detection steps may be carried out.

Figure 9:
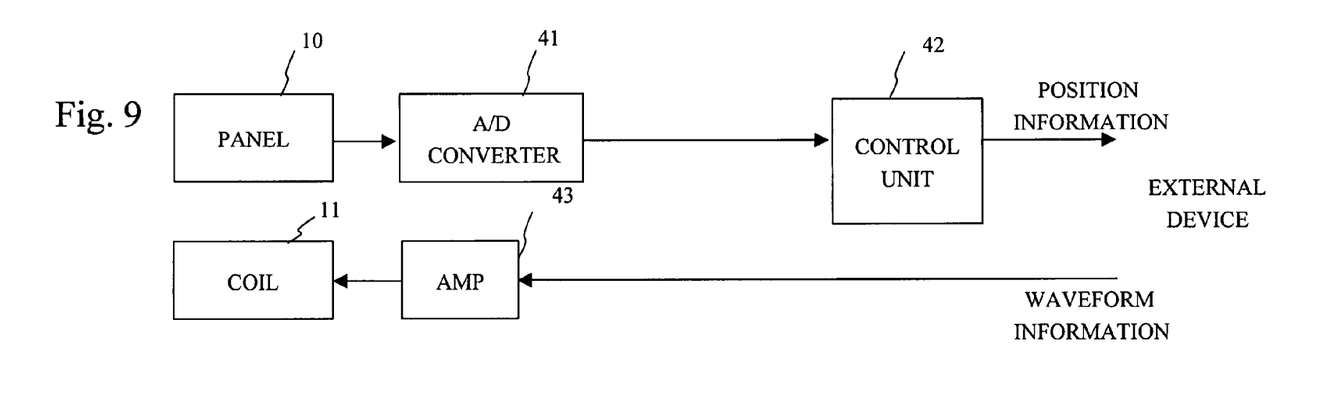
FIG. 9 is a block diagram of a panel drive unit employed in the tactile presenting device.

FIG. 9 is a block diagram of a panel drive unit, which may be mounted on the panel printed-circuit board 23. The analog signals produced by the above-mentioned manner are converted into digital signals by an analog-to-digital converter 41. The digital signals are then applied to a control unit 42, which detects the position information by the above-mentioned manner. The control unit 42 may, for example, be a microcomputer, and executes a program, which will be described later. The position information is supplied to an external device to which the tactile presenting device is connected. The external device supplies the tactile presenting device to waveform information. The waveform information describes the waveform, which may be as shown in FIG. 3A, 3B or 4. An amplifier 43 generates a current based on the waveform information, and supplies it to the coil 11.

Figure 10:
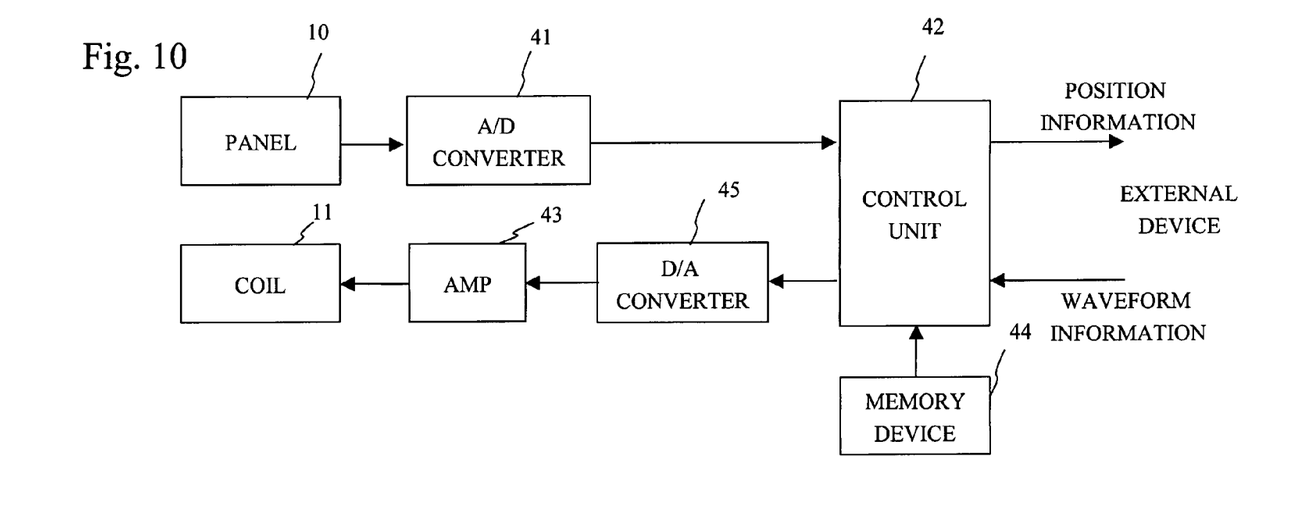
FIG. 10 is a block diagram of another panel drive unit employed in the tactile presenting device.

FIG. 10 is a block diagram of another structure of the panel drive unit, in which parts that are the same as those shown in the previously described figures are given the same reference numerals. The control unit 42 receives waveform selection information from the external device. The control unit 42 selects waveform information corresponding to the received waveform selection information from among items of waveform information respectively indicative of the respective waveforms stored in a memory device 44. For example, the items of waveform information stored in the memory device 44 respectively describe the waveforms as shown in FIGS. 3A, 3B and 4. The waveform information thus selected is applied to a digital-to-analog converter 45, which converts the waveform information described in digital fashion into a corresponding analog signal, which is applied to the amplifier 43.

Figure 11:
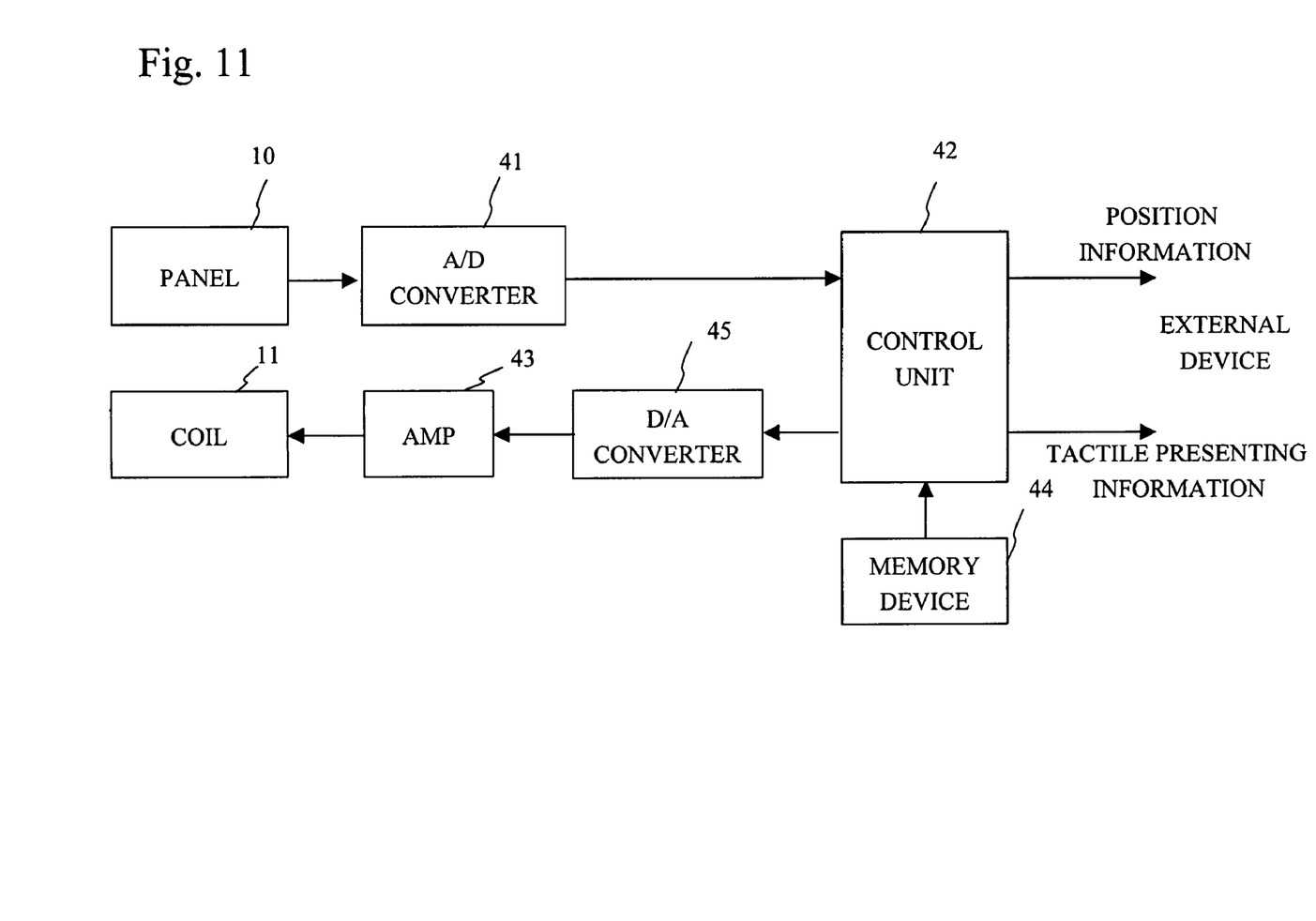
FIG. 11 is a block diagram of yet another panel drive unit employed in the tactile presenting device.
Figure 12:
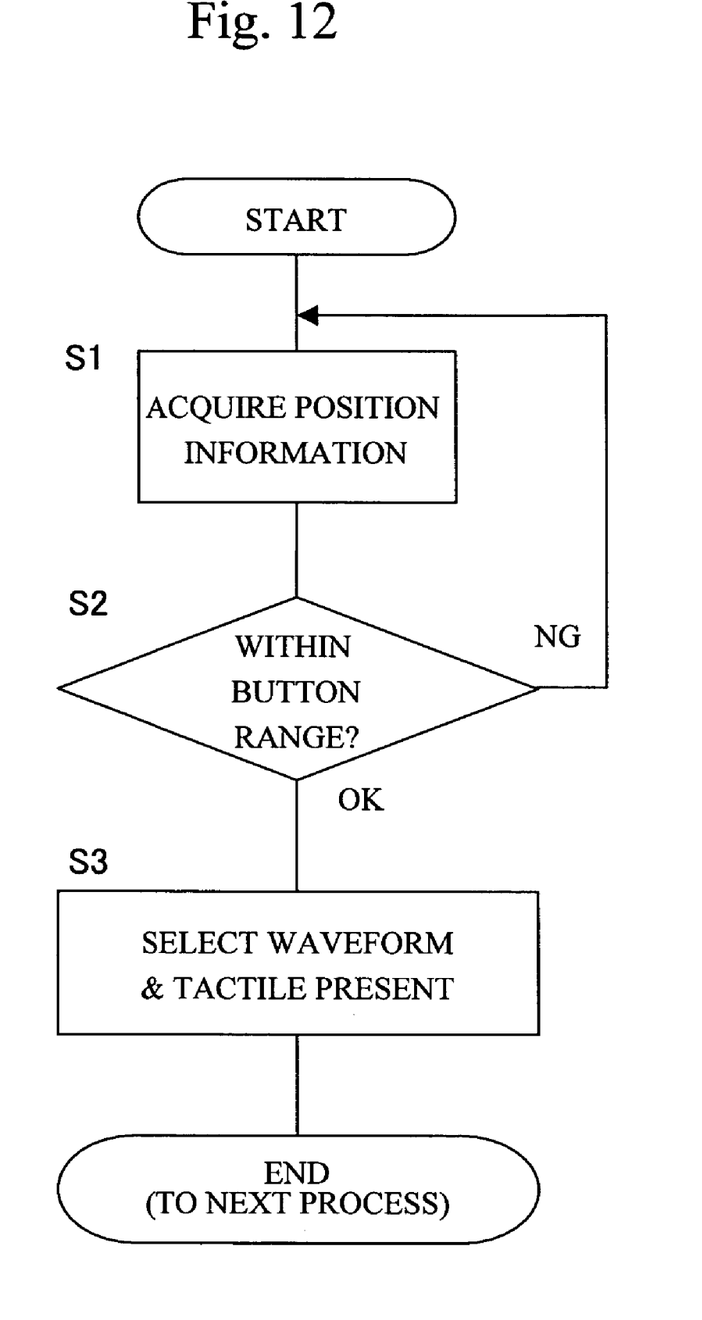
FIG. 12 is a flowchart of an operation of the tactile presenting device shown in FIG. 11.

FIG. 11 is a block diagram of yet another structure of the panel drive unit, which differs from that shown in FIG. 10 in that the structure shown in FIG. 11 can output tactile presenting information to the external device in addition to the position information, and the control unit 42 has an ability of selecting the desired waveform information without receiving information from the external device. FIG. 12 is a flowchart of an operation of the tactile presenting device shown in FIG. 11. The control unit 42 acquires the position information indicating the depressed position on the panel (step S1). The control unit 42 determines whether the position indicated by the position information is within a predetermined button range (step S2). Positions corresponding to buttons on the panel 10 are predetermined, and the control unit 42 has position information describing the button ranges. When the determination result of step S2 is YES, the control unit 42 selects the corresponding waveform, and outputs information indicating the tactile selected to the external device (step S3). Simultaneously, the control unit 42 reads the waveform information about the selected waveform from the memory device 44, and outputs it to the digital-to-analog converter 45. When the determination result of step S2 is NO, the control unit 42 returns to step S1.

Figure 13:
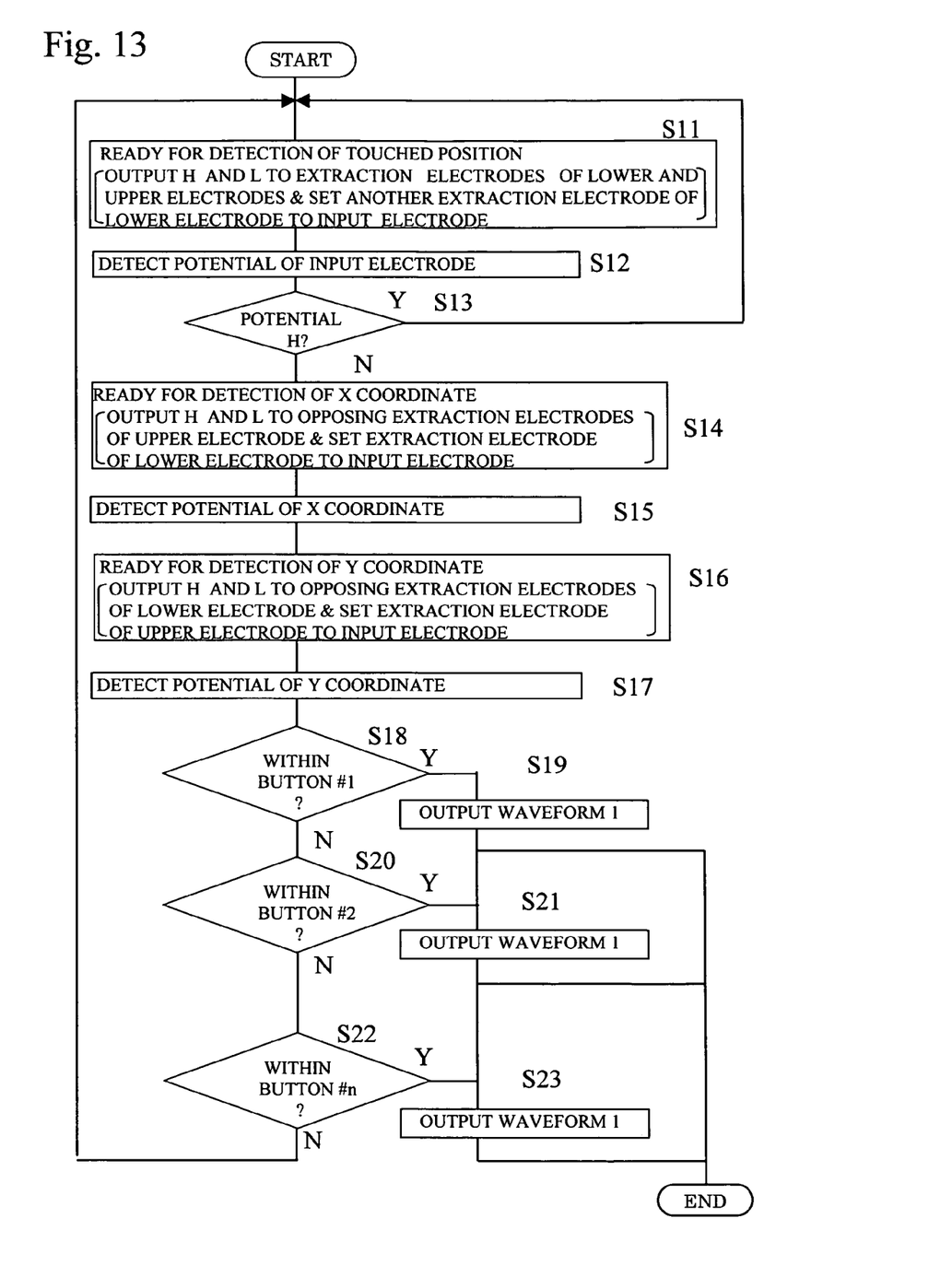
FIG. 13 is a flowchart of operations of the tactile presenting devices shown in FIGS. 9, 10 and 11.
Figure 14:
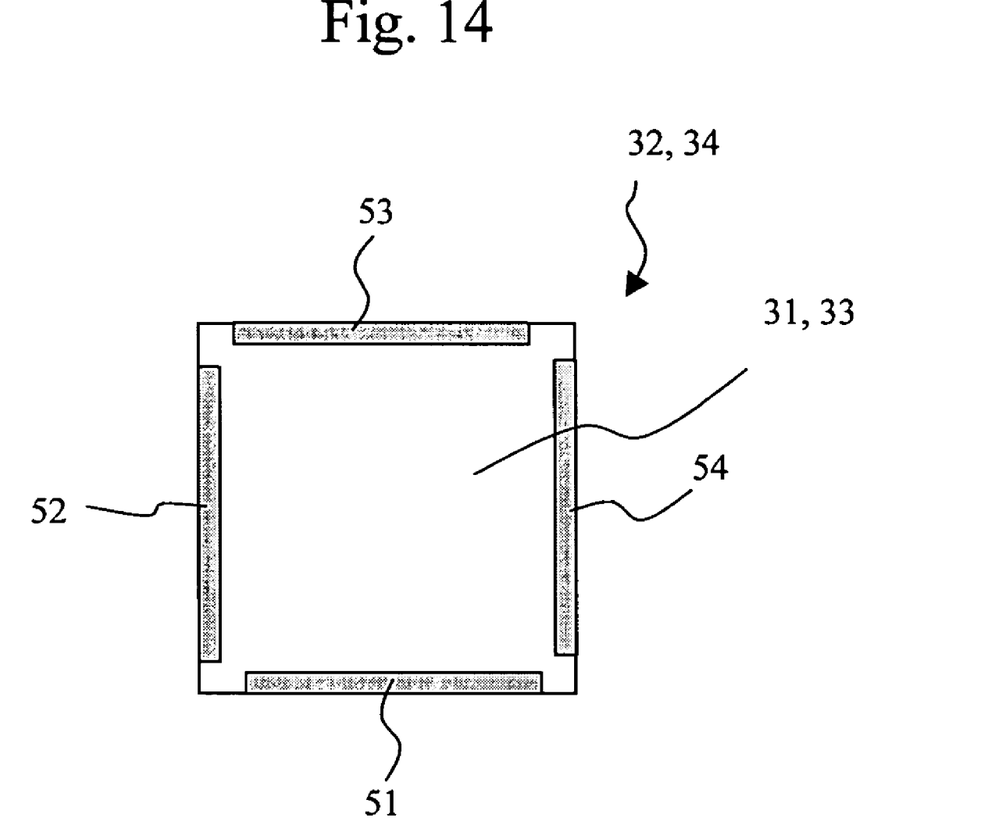
FIG. 14 is an example of extraction electrodes provided on upper and lower transparent electrodes.

FIG. 13 is a flowchart of the detailed operation of the control unit 42 shown in FIGS. 9 through 11. In the structure shown in FIG. 9, some steps shown in FIG. 13 are executed by the external device. In the following, the flowchart of FIG. 13 will be described as the operation of the control unit 42 of the tactile presenting device shown in FIG. 10. The control unit 42 prepares detection of touch (step S11). FIG. 14 shows lead extraction electrodes 51 through 54 provided on each of the upper transparent electrode 32 and the lower transparent electrode 34. At step S11, the control unit 42 applies a given voltage (indicated as "H" in FIG. 13) to, for example, the extraction electrode 52 of the lower transparent electrode 34, and applies the extraction electrode 53 of the upper transparent electrode 32 to the ground potential (indicated as "L" in FIG. 13). Further, the control unit 42 assigns the extraction electrode 54 of the lower transparent electrode 34 to an input electrode (also referred to as a detection electrode). At step S12, the control unit 42 senses the potential of the input electrode, and checks whether the potential of the input electrode is H at step S13. The control unit 42 returns to step S11 when the determination result of step S13 is YES, and proceeds to step S14 otherwise. At step S14, the control unit 42 prepares detection of the X coordinate. More specific, the control unit 42 sets the extraction electrode 52 of the upper transparent electrode 32 to H, and sets the opposing extraction electrode 54 to L. Further, the control unit 42 sets the extraction electrode 51 of the lower transparent electrode 34 to the input electrode. Thereafter, the control unit 42 detects the potential of the X coordinate at step S15. When the panel 10 is depressed, the input electrode is at the potential corresponding to the depressed point. The control unit 42 receives the digital value of the detected potential via the analog-to-digital converter 41. The digital value indicates the X coordinate of the depressed point. At step S16, the control unit 42 prepares the Y coordinate. More specific, the control unit 42 sets the extraction electrode 52 of the lower transparent electrode 34 to H, and sets the opposing extraction electrode 54 to L. Further, the control unit 42 sets the extraction electrode 51 of the upper transparent electrode 32 to the input electrode. At step S17, the control unit 42 detects the Y coordinate.

At step S18, the control unit 42 determines whether the touched position specified by the X and Y coordinates falls within the range of button #1. When the determination result is YES, the control unit 42 reads the waveform information associated with button #1 from the memory device 44, and sends it to the digital-to-analog converter 45. Similarly, at step S20, the control unit 42 determines whether the touched position falls within the range of button #2. When the determination result is YES, the control unit 42 reads the waveform information associated with button #2 from the memory device 44, and sends it to the digital-to-analog converter 45. Similarly, up to step S22, the control unit 42 determines whether the touched position falls within the range of any of n buttons. When the determination result is YES, the control unit 42 reads the corresponding waveform information from the memory device 44.

In the structure shown in FIG. 9, the control step 42 executes steps S11 to S17, and the external device executes steps S18 to S23.

As described above, the present tactile presenting device can vibrate the panel 10 with the predetermined waveform associated with the depressed position, and are thus used for various applications. For instance, when the tactile presenting device is applied to an electronic calculator, it is easy to realize a man-machine interface such that numeral keys may be vibrated weakly, and the enter key may be vibrated strongly. When the tactile presenting device is applied to data input for an industrial robot, a waveform having only a single peak (FIG. 3A) is used for correct scan, and another waveform having successive peaks is used for an incorrect operation (for example, an alphabet is incorrectly input in a case where a numerical value is required). In an application in which displayed images change like A, B, C A, B . . . , a strong vibration is used at a switching from image C to image A, and a weak vibration is used at other switching. When the tactile presenting device is applied to an external character editor, a waveform having only a single peak is used when the dot changes from white to black, and another waveform having two peaks is used when the dot changes from black to white.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A tactile presenting device comprising:
a panel presenting a tactile sensation; and
a control unit that vibrates the panel in a direction perpendicular to a surface of the panel by magnetic force, the control unit vibrating the panel at a frequency lower than 50 Hz, the control unit comprising:
coils wound along four sides of the panel so that current flows in opposite directions in each of the sides, and
magnetic units arranged along the four sides of the panel, each of the magnetic units having a magnet and a yoke.

2. The tactile presenting device as claimed in claim 1, wherein the control unit vibrates the panel once in only one of the directions perpendicular to the surface of the panel.

3. The tactile presenting device as claimed in claim 1, wherein the control unit vibrates the panel multiple times in only one of the directions perpendicular to the surface of the panel.

4. The tactile presenting device as claimed in claim 1, wherein the control unit vibrates the panel multiple times in both directions perpendicular to the surface of the panel.

5. The tactile presenting device as claimed in claim 1, wherein the control unit vibrates the panel so as to have a waveform having no inflection point.

6. The tactile presenting device as claimed in claim 1, wherein the control unit vibrates the panel so as to have a waveform defined by squaring a sine wave.

7. The tactile presenting device as claimed in claim 1, wherein the control unit vibrates the panel so as to have a waveform having an amplitude equal to or greater than 0.2 mm.

8. A tactile presenting device comprising:
a panel presenting a tactile sensation;
a control unit that vibrates the panel in a direction perpendicular to a surface of the panel by magnetic force, the control unit vibrating the panel at a frequency equal to or lower than 50 Hz; and
a position detecting portion that identifies a touched position on the panel,
wherein the control unit vibrates the panel when a predetermined time elapses after the position detecting portion identifies the touched position identified.

9. The tactile presenting device as claimed in claim 1, further comprising suspensions that support the panel.

10. The tactile presenting device as claimed in claim 1, further comprising a position detecting portion that identifies a touched position on the panel, wherein the control unit vibrates the panel on the basis of the touched position identified.

11. The tactile presenting device as claimed in claim 10, wherein the control unit selects one of multiple vibration waveforms prepared beforehand associated with the touched position identified by the position detecting portion.

12. The tactile presenting device as claimed in claim 10, wherein the control unit vibrates the panel when it is determined that the touched position identified is within a predetermined range on the panel.

13. The tactile presenting device as claimed in claim 1, wherein the control unit vibrates the panel so as to have a vibration waveform that is one of multiple vibration waveforms prepared beforehand and is externally instructed.

14. The tactile presenting device as claimed in claim 1, further comprising a cover member that is attached to a frame of the tactile presenting device and allows the panel to be vibrated in the direction perpendicular to the surface of the panel.

15. A method of presenting a tactile sensation comprising:
vibrating a panel in a direction perpendicular to a surface of the panel by magnetic force; and
controlling vibration of the panel at a frequency lower than 50 Hz with a control unit comprising coils wound along four sides of a panel so that current flows in opposite directions in each of the sides, and magnetic units arranged along the four sides of the panel, each of the magnetic units having a magnet and a yoke.

16. A tactile presenting device comprising:
a control unit that vibrates a panel at a frequency lower than 50 Hz with an amplitude of vibration equal to 0.2 mm or greater by a magnetic force so the panel will present a tactile sensation.

17. A control unit for a tactile presenting device, the control unit comprising:
a coil wound along four sides of a panel, which is capable of presenting a tactile sensation, so that current flows in opposite directions in each of the sides; and
a magnet and a yoke arranged along each of the four sides of the panel.

* * * * *